(12) United States Patent
Friman (10) Patent No.: US 7,243,052 B2
(45) Date of Patent: Jul. 10, 2007

(54) METHOD AND APPARATUS FOR DETERMINING HYSTERESIS

(75) Inventor: Mats Friman, Helsinki (FI)

(73) Assignee: Metso Automation Oy, Helsinki (FI)

( * ) Notice: Subject to any disclaimer, the term of this patent is extended or adjusted under 35 U.S.C. 154(b) by 27 days.

(21) Appl. No.: 10/527,026

(22) PCT Filed: Sep. 12, 2003

(86) PCT No.: PCT/FI03/00669

§ 371 (c)(1),
(2), (4) Date: Mar. 14, 2005

(87) PCT Pub. No.: WO2004/025384

PCT Pub. Date: Mar. 25, 2004

(65) Prior Publication Data

US 2005/0240364 A1    Oct. 27, 2005

(30) Foreign Application Priority Data

Sep. 13, 2002    (FI) ................................. 20021644

(51) Int. Cl.
*G06F 15/00* (2006.01)
(52) U.S. Cl. ..................... 702/199; 700/282
(58) Field of Classification Search .................. 702/57, 702/65–67, 70, 71, 74, 79, 116, 149, 150, 702/177, 183, 189, 193, 194, 199; 324/127; 73/23.2; 700/45, 282
See application file for complete search history.

(56) References Cited

U.S. PATENT DOCUMENTS

| 4,059,798 | A | * | 11/1977 | Dierker et al. | ............... 324/127 |
| 4,185,845 | A | * | 1/1980 | Misch et al. | ............. 280/6.158 |
| 5,434,566 | A | * | 7/1995 | Iwasa et al. | ................... 341/34 |
| 5,789,659 | A | * | 8/1998 | Williams | ..................... 73/23.2 |
| 2004/0130974 | A1 | * | 7/2004 | Awano et al. | ............ 369/13.38 |

FOREIGN PATENT DOCUMENTS

WO    WO 01/11436 A1    2/2001

OTHER PUBLICATIONS

K.T. Woo et al.; "A Fuzzy System Compensator for Backlash"; Proceeding of the 1998 IEEE International Conference on Robotics and Automation, Belgium; May 1998; pp. 181-186.

(Continued)

*Primary Examiner*—Hal Wachsman
*Assistant Examiner*—Mohamed Charioui
(74) *Attorney, Agent, or Firm*—Oliff & Berridge, PLC (57) ABSTRACT

The invention relates to a method and a system for determining hysteresis of a process device in a process environment. The process comprises collecting (50) second-level sample data ys and us from control and measurement signals u and y of a control circuit. Minute mean values y(min) and u(min), which are stored in a database (52), are calculated from these second-level measurement values. The pairs suitable for hysteresis calculation are selected from the minute-level sample pairs um and ym according to a certain procedure. The pairs are also divided into two groups. Unsuitable pairs are rejected (57). Two characteristic curves (54) are calculated from the selected pairs (um, ym) for hysteresis calculation (55). The calculation (55) also includes a routine which evaluates the reliability of the identified hysteresis.

17 Claims, 4 Drawing Sheets

OTHER PUBLICATIONS

Ren Xue-Mei et al.; "Adaptive Nonlinear PID Control and Rule-Based Compensation for Systems with Backlash"; Journal; of Beijing Institute of Technology, vol. 9, No. 2; 2000; pp. 195-200.

Dieter Strobl et al.; Motion Control (MC'98); Proceedings volume from the IFAC Workshop, Grenoble, France; Sep. 21-23, 1998; pp. 1-6.

* cited by examiner

METHOD AND APPARATUS FOR DETERMINING HYSTERESIS

FIELD OF THE INVENTION

The invention relates to process automation systems.

BACKGROUND OF THE INVENTION

In a process automation system, a control loop typically consists of a process, a measurement, a controller and an actual control element, such as a valve, and a related device, such as a valve controller (positioner) and an actuator. An optimal process control depends on how appropriately all these components function.

In the processing industry, such as the pulp and paper industry, and petroleum refining, petrochemical and chemical industries, various control valves mounted in the plant pipe system control material flows in the process. A material flow may contain any fluid material, such as flowing substances, liquors, fluids, gases or vapours. At its simplest, the control valve may be a manually-controlled mechanical valve. Usually, the valve is provided with a valve controller and an actuator. The valve controller and actuator adjust the position of a control valve according to the control input (e.g. pneumatic or electric control input) received from the process control system.

Figure 1:
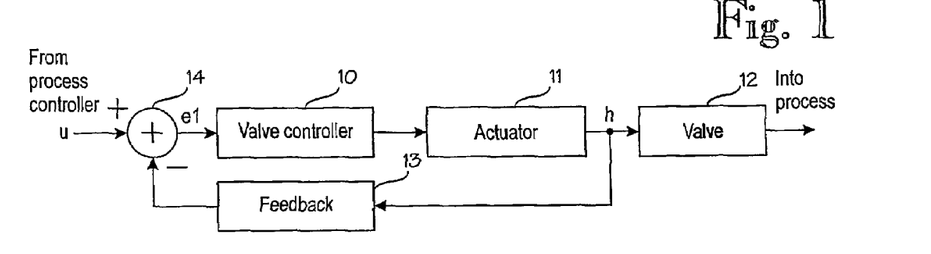
FIG. 1 is a functional block diagram of a control valve.

FIG. 1 exemplifies a functional block diagram of a control valve. A valve controller (i.e. positioner) 10 controls the travel/position (h) of the valve by means of the torque generated by an actuator 11. Position information (h) is provided as feedback from the actuator 11 or valve 12 to an adder arranged at the input of the valve controller. The function of the valve controller is mainly based on an error (e) between an input signal u (control signal from the process) and a feedback position (h). The valve controller 10 minimizes this error by a control algorithm, such as a state or PID algorithm. This control algorithm is tailored for each valve and, if necessary, it can be tuned during the installation or operation. The tuning may include changing gain parameters. It is also feasible to use one or more additional feedbacks in the valve controller 10, such as speed or pressure feedback from the actuators cylinder, to obtain a more balanced and accurate control function of the valve position.

Figure 2:
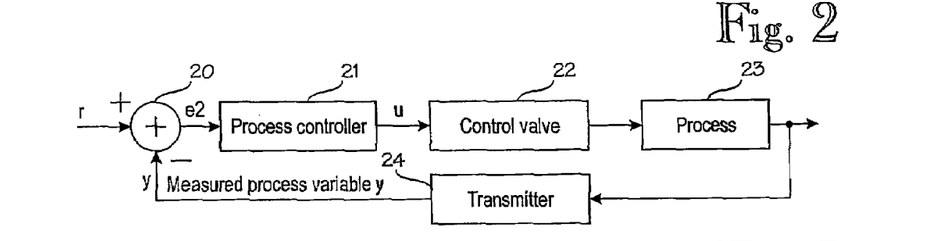
FIG. 2 illustrates a typical model of a process control loop.

FIG. 2 illustrates a typical model of a process control loop which controls one control valve 22 and therethrough one material flow in a process. The control valve 22 may be similar to the one shown in FIG. 1, for instance. The process control loop includes a process controller 21, which is provided with a control algorithm, which produces a control signal u for controlling the control valve 22 according to a set point r (which is obtained from a control room computer, for example) and a feedback process variable y. The control algorithm may be any algorithm that is used in control systems, such as PID, PI or P control. The control signal u fed to the control valve 22 controls the valve position and travel and thus the material flow in the process. A desired process variable y is measured by a measurement transmitter 24 and it is compared (block 20) to the set point r of the same process variable to produce an error signal e2, which is fed into the process controller 21. The process controller 21 changes the control signal to minimize the control error 2e. The process control error typically results from changes in a positioning error and process interference.

The valve and its auxiliary devices often constitute the weak link in the control loop since they are the only moving parts. This movement causes problems, which decrease the capacity of the control loop. To avoid a backlash resulting from mechanical adjustments, the valve, actuator and valve controller/positioner have to be provided with mechanical tolerances that are sufficiently tight. As a result of the backlash, the valve movement does not follow the control signal accurately but deviates from it. The influence of the backlash becomes apparent in particular when the valve control direction and thus the valve's direction of movement are reversed. In that case, the control signal value keeps changing for a while until the measured output signal starts to change noticeably. This is also known as the dead band of control. In addition to the backlash in an actuator or positioner, this phenomenon may result from sticking of the valve or other mechanical factors, such as initial friction. The backlash between mechanical parts naturally increases as the parts wear.

Figure 3:
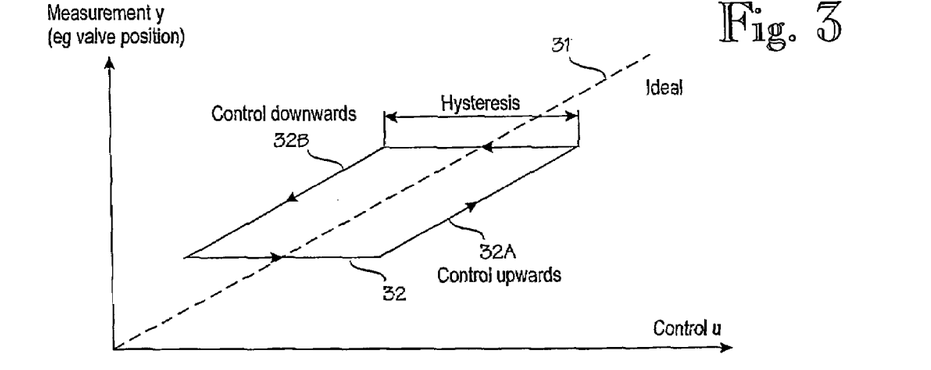
FIG. 3 is a graph illustrating a characteristic curve and hysteresis of the control loop.

The backlash and other error factors cause hysteresis between the control of the process device, such as a valve and/or its auxiliary devices, and the measured response. This is illustrated in FIG. 3. Straight line 31 illustrates an ideal relation, i.e. characteristic curve, between the control u and the measurement (output) y, such as valve position. The real dependency between the measurement and the control is illustrated by characteristic curve 32. As appears from FIG. 3, due to the backlash and any other factors, the upward control (increasing u) has a characteristic curve 32A different from that of the downward control (decreasing u), which has characteristic curve 32B. The difference between the curves represents hysteresis in the control of the process device.

In some cases, the controllers are provided with automatic backlash compensation, which attempts to take the mechanical non-ideality of the device into account always when the control direction is reversed. This approach is described in U.S. Pat. No. 5,742,144, for example. Approach of this kind is good in theory but limited in practice since the backlash and hysteresis vary due to different factors.

The information on hysteresis and backlash is, however, important to the tuning of the control circuit. It also gives useful information on the condition of the process device, such as a valve and/or its actuator or valve positioner. If hysteresis or backlash increases significantly, service measures can be taken to fix the matter.

A typical way of detecting the hysteresis or backlash of an actuator is to switch the controller to a manual controlling mode and perform a sequence of step tests. In that case, the actuator is driven to the same position from different directions, in which case any differences between the control and the response due to backlash or hysteresis are found out by means of measurements. Another typical way is to drive the actuator back and forth over the whole control area and to estimate backlash and hysteresis from the measurement results. In the case of a valve actuator, for example, the valve is driven from the closed position to the open position and back to the closed position. A problem associated with these solutions is, however, that they are separate tests that need to be carried out when the process is interrupted or the process device to be examined is bypassed or detached from the process. Similar tests that are performed on the valve positioner are described in IEC (International Electrotechnical Commission) standard 61514, Industrial process control systems: Methods of evaluating the performance of valve positioners with pneumatic outputs, first edition, 2000-04.

WO 01/11436 discloses a method and an apparatus which statistically determine estimates for one or more process control loop parameters for the device or the control loop that is active in the process control environment. Such parameters include friction, dead band, dead time, vibration or backlash. In the method, one or more signals are always measured in the process control loop when the process control loop is connected to the on-line process control environment. The measured signal is stored as signal data, after which a number of statistical analyses are carried out on the stored data to determine the desired parameter estimate. An advantage of this solution is that the process device does not need to be removed from process or the control loop bypassed for the test.

In practice, the on-line determination of hysteresis or backlash is sensitive to process interference as well as inaccurate. Furthermore, it usually requires statistical calculation methods, matrix calculation, mathematical functions, etc.

BRIEF DESCRIPTION OF THE INVENTION

The object of the invention is to provide a new method and apparatus for determining hysteresis or backlash of a process device in normal run in a process in a relatively simple and accurate manner.

The object of the invention is achieved by the method and system described in the attached independent claims. Preferred embodiments of the invention are described in the dependent claims. The present invention comprises collecting sample pairs of a signal representing the control of a process device in normal run and a signal representing its output. The signal representing the output can be, for example, a process variable measured in the process. It may also be the set point of a process variable. Each collected pair of control/output samples comprises an average control input and a measured average output, which have been calculated for a predetermined collection period. In an embodiment of the invention, a momentary sample pair is typically taken from the signal representing the control input and from the measured signal representing the output at certain intervals, the interval being preferably in the order of one or more seconds. Such data is often called 'second-level data' or 'seconds data'. As in one embodiment of the invention, an average sample pair is then calculated from the momentary sample pairs (e.g. seconds data) taken during the collection period. The collection period is preferably in the order of one or more minutes, and thus the mean values are often called 'minute mean values'.

Before calculating characteristic curves, sample pairs suitable for further processing are screened from the collected raw data on the basis of the magnitude and direction of the relative change of the average control input. This screening is of great importance to the accuracy of the method. In normal run, the control circuit continuously controls the process device so that the control zigzags in both directions. In addition, various kinds of interference occur. By screening suitable sample pairs for further processing on the basis of the magnitude and direction of the relative change of their control input, corner or turning points of the control situation where the control direction changes can be found out. As the control direction changes, the measured output may fall in a vague area due to hysteresis or backlash and thus cause errors in the final calculation of characteristic curves. The screening according to the invention ensures that the samples selected for calculation represent a stable situation either in upward control or in downward control. In an embodiment of the invention, this selection or screening is carried out by calculating the change in the average control input in relation to the average control input of the previous sample pair and the direction of change for each sample pair. If the calculated change is smaller and has occurred in the same direction as the change calculated for the control input of the previous sample pair, the sample pair is selected for further processing; otherwise the sample pair is rejected.

According to the invention, the sample pairs are also grouped into a first group and a second group according to the direction or sign of the relative change of the average control input of each sample pair. These two groups represent upward control (increasing control value, positive sign) and downward control (decreasing control value, negative sign). The grouping can also take place before, during or after screening. By means of the screened sample pairs of the first and the second group, a first and a second control/output characteristic curve representing ascending and descending control are calculated. Finally, the hysteresis or backlash of the process device is determined on the basis of these characteristic curves as a distance between the first and the second characteristic curve at least at one point. In practice, the calculation of a characteristic curve comprises calculation of at least a few points for each characteristic curve. The determination of hysteresis or backlash means that the distance parallel with the control axis is determined at least at one point determined this way.

It is important for the operators of an industrial process to know how reliable the hysteresis or backlash obtained in the manner according to the invention is. The reliability varies with different process conditions. In an embodiment of the invention, a reliability value is also calculated for the determined hysteresis or backlash by a function, which includes the following information as parameters

- the number $Ny1$ of average sample pairs belonging to the first, ascending characteristic curve,
- the number $Ny2$ of average sample pairs belonging to the second, descending characteristic curve,
- the number $Noy1$ of sample pairs which belong to the first characteristic curve but are below the second characteristic curve, and
- the number $Noy2$ of sample pairs which belong to the second characteristic curve but are above the first characteristic curve.

This determination of reliability is based on the fact that the higher the number of the measurement pairs which are used for calculating a certain characteristic curve and are below the second curve, the more unreliable the result is. According to an embodiment of the invention, the reliability value is calculated by function $L=\max(0,1-Noy1/Ny1-Noy2/Ny2)$, in which case L may obtain values from 0 to 1, where $L=1$ is completely reliable and $L=0$ is completely unreliable.

BRIEF DESCRIPTION OF DRAWINGS

In the following, the invention will be described by means of exemplary embodiments, with reference to the accompanying drawings, in which.

DETAILED DESCRIPTION OF THE INVENTION

The present invention is applicable to all industrial processes and the like. The invention is not limited to any particular process device but it can be applied in various devices that control a process, such as valves, pumps, fans, heat exchangers, etc.

The exemplary embodiments of the invention will be described using control valves and their auxiliary devices, i.e. valve controllers (positioners) and actuators, as examples.

Figure 4:
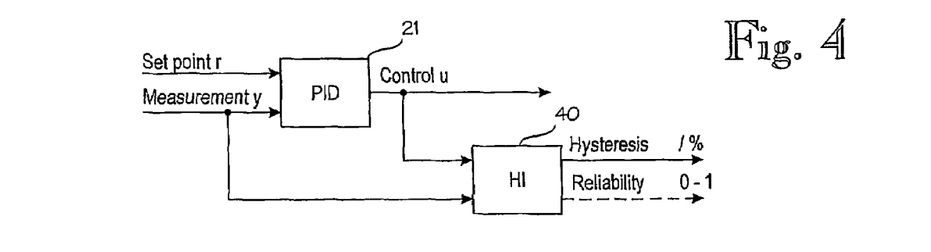
FIG. 4 is a schematic functional block diagram illustrating an algorithm according to an embodiment of the invention for determining hysteresis.

FIG. 4 is a schematic functional block diagram illustrating an algorithm according to an embodiment of the invention for determining hysteresis. The controller 21 is similar to the PID process controller shown in FIG. 2, for instance. It receives as input a set point r of certain type and a measured process variable or another measurement y, which represents the control response or output of the control circuit or process device to be monitored. The controller 21 provides control u, which is fed into the process device, such as a valve controller, an actuator or a positioner. Block 40 represents hysteresis identification according to an embodiment of the invention. In the example of FIG. 4, block 40 collects samples from the control signal u and feedback measurement result y. The measurement result may be the measured value of a controllable process variable, such as the measured flow as valve output. Instead of the actual controllable process variable, the measurement result y may be any measured process variable that represents the output and correlates appropriately with the controllable process variable or output. Alternatively, the measurement result may be replaced with a sample representing the set point r. This may be done particularly in cases where the measurement value y has been noted to follow well the set point r. This is the case in the example illustrated in FIG. 6A, for instance.

Figure 5:
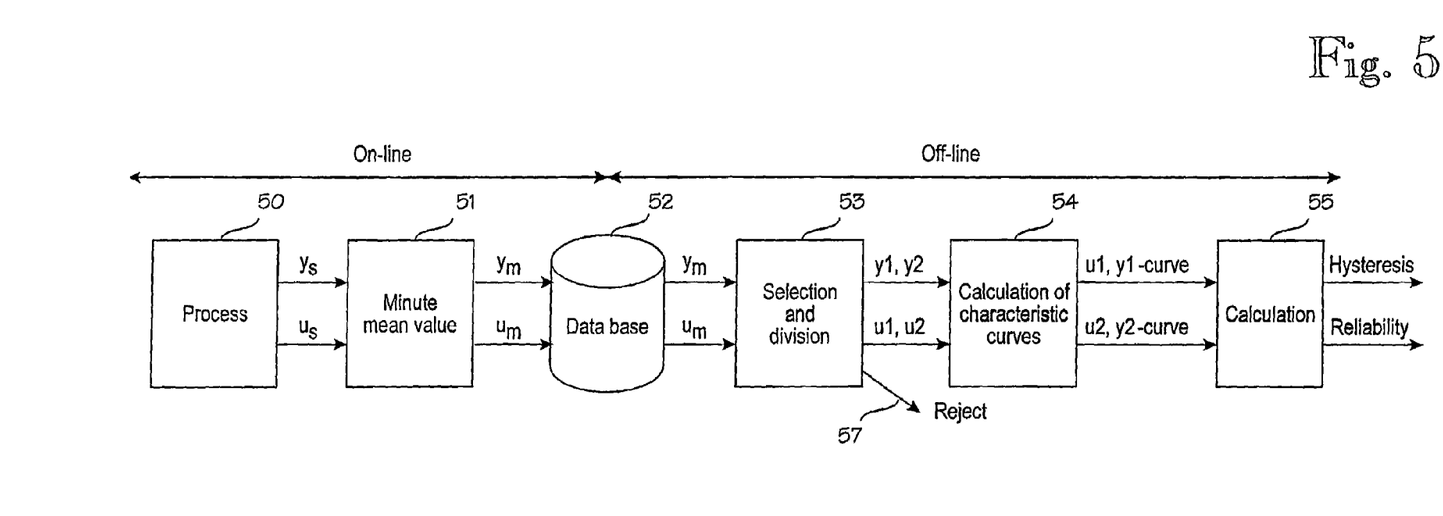
FIG. 5 is a data flow chart illustrating the algorithm shown in detection block 40 of FIG. 4.

In an embodiment of the invention, the hysteresis detection block 40 follows the algorithm illustrated by the data flow chart of FIG. 5. Block 40 collects second-level sample data $y_s$ and $u_s$ on the process from the control and measurement signals u and y of the control circuit. In the second-level data, a typical sampling rate is one second or a few seconds, but the invention is not limited to any particular sampling rate. This sample data is processed in different stages and as a result, the calculation provides an estimate for the hysteresis and reliability of the process device or control circuit. The method can be divided into an on-line phase and an off-line phase, but this division is not necessary or it can be performed differently from what is described in this example.

In the on-line phase, second-level measurements are collected from the process control circuits or from the controller 21 control u and measurement y using another collecting rate, as illustrated in phase 50 in FIG. 5. Minute mean values $y_m$ and $u_m$ are calculated from the second-level measurement values in step 51 and these are stored in a database in step 52. The minute mean value means that the mean values are calculated from second-level values collected during a collection period whose duration is approximately one minute or in the order of minutes. The collection period over which the mean value is calculated may vary depending on the application. The controller speed or integration time $T_i$ is typically taken into account in the selection of a mean value period so that the updating period $T_p$ (collecting period) of mean values fulfills the condition $T_i < T_p < 5 \times T_i$. If the controller's integration time $T_i$ were short in relation to the updating period $T_p$, the controller 21 would have enough time to perform several controls during one period $T_p$. To give an example, $T_i$ is typically in the order of 10 to 20 seconds in flow control.

If the automation system already includes on-line collection for another purpose, by means of which minute mean values, for example, are collected from the control and measurement signals of the control circuit, this information can be utilized as such for the purpose of the present invention. In that case, the existing operations would replace steps 50, 51 and 52 in FIG. 5.

The minute-level (u, y) pairs stored in the on-line phase are retrieved later, for example once a day, once a week or at another interval, from the database for hysteresis calculation. The pairs suitable for hysteresis calculation are selected from the stored minute-level sample pairs $u_m$ and $y_m$ according to a certain procedure (step 53). The pairs are also divided into two groups. Unsuitable pairs are rejected (step 57). Two characteristic curves (54) are calculated from the selected pairs ($u_m$, $y_m$) for calculating hysteresis (step 55). The calculation 55 also includes a routine which estimates the reliability of the identified hysteresis.

In the following, implementation of different phases of the algorithm according to the invention will be described in greater detail by examples.

Calculation of Minute Mean Value

In an embodiment, the second-level sample pairs (or sample pairs taken at another collecting interval) from the measurement and control signals y and u are collected into buffers $y_{s(i)}$ and $u_{s(i)}$, where i=1 ... N (the buffer length is N=60 when the second/minute calculation is used). The minute-level mean values $y_m$ and $u_m$ or mean values with another storing frequency are calculated on the basis of the seconds data included in the buffers.

Selection and Division of Pairs of Control and Measurement

In an embodiment before calculating a characteristic curve, the pairs of control and measurement samples suitable for hysteresis calculation are selected from the minute-level raw data. The selected sample pairs are further divided into two groups G1 and G2 depending on whether the control circuit control goes upwards (the value of control u increases) or downwards (the value of control u decreases).

A pair ($u_m(j)$, $y_m(j)$) of minute mean values is selected for the calculation of characteristic curve if the following two conditions are fulfilled:

$$|\Delta u_m(j)| < |\Delta u_m(j-1)|$$

$$\text{sign}(\Delta u_m(j)) = \text{sign}(\Delta u_m(j-1))$$

where
$u_m(j)$ is the average control input of sample pair j,
$y_m(j)$ is the average measured output of sample pair j,
j is an integer index, $$\Delta u_m(j) = u_m(j) - u_m(j-1)$$

sign($\Delta u_m$) calculates the sign of $\Delta u_m$.

In other words, a pair of measurement and control samples is accepted for hysteresis calculation only if the change $\Delta u_m(j)$ in the minute mean value $u_m(j)$ of the control is smaller than the change calculated for the control of the previous sample pair and the change has occurred in the same direction as the previous change.

The pairs of control and measurement samples are further divided into two groups on the basis of the sign of the control change $\Delta u_m$ as follows: a sample pair is taken in group G1 when the sign of the change is positive (the control goes upwards) and a sample pair is taken in group G2 when the sign of the change is negative (the control goes downwards).

Figure 6A:
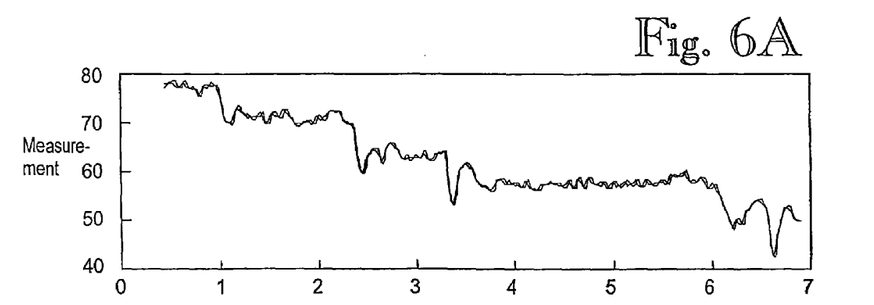
FIG. 6A illustrates minute mean values of measurement y.
Figure 6B:
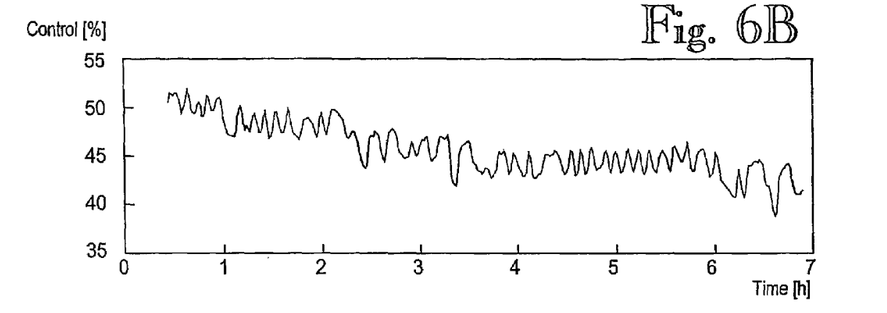
FIG. 6B illustrates minute means values of control u as a function of time.
Figure 7A:
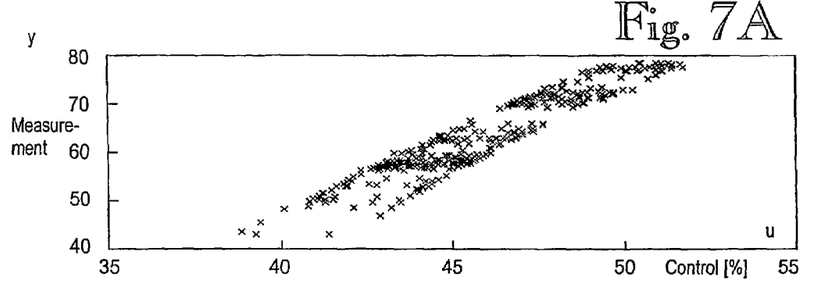
FIG. 7A illustrates characteristic curves formed without the selection according to the invention, FIG. 7B illustrated characteristic curves formed using the selection according to the invention.
Figure 7B:
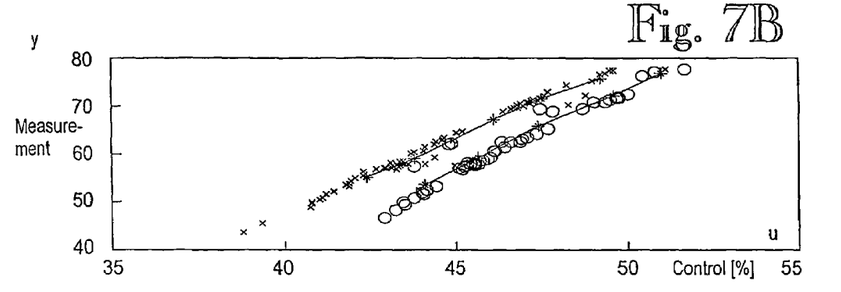

The selection and grouping carried out according to the principles of an embodiment of the invention are very essential to the accuracy and reliability of hysteresis determination. This can be examined by means of an example related to flow control. Minute mean values are collected from measurement and control signals of a control circuit for approximately 6.5 hours according to the invention. FIG. 6A illustrates minute mean values of measurement y and FIG. 6B illustrates minute mean values of control u as a function of time. It can be seen from FIGS. 6A and 6B that the control signal u zigzags; a phenomenon that may indicate a fault in the operation of an actuator. If pairs of control and measurement samples are formed from the minute mean values shown in FIGS. 6A and 6B and characteristic curves are drawn without the selection according to the invention, we obtain the result shown in FIG. 7A. It can be seen that the pairs of control and measurement samples fill the whole hysteresis area and no clear curves are discernible. Next, we will examine an embodiment according to the invention where the pairs of control and measurement samples suitable for hysteresis calculation are selected and the pairs are divided into two groups. The selected samples pairs are shown in FIG. 7B, where the sample pairs of group G1 (control moves upwards) are marked with symbol o and the sample pairs of group G2 (control moves downwards) are marked with symbol x. Furthermore, two characteristic curves -*- have been drawn on the basis of these pairs. It appears from FIGS. 7A and 7B that the selection and grouping according to the invention transform the vague set of points shown in FIG. 7A into two clear characteristic curves, of which one represents upward control (in the positive direction) and the other downward control (in the negative direction). This simple example shows that the selection and grouping have great significance for the accuracy of the method according to the invention.

Calculation of Characteristic Curves

In an embodiment after the selection and division, characteristic curves are calculated from the sample pairs in step 54. There are two characteristic curves, both of which are calculated by the same algorithm. The following describes an algorithm for calculating one characteristic curve.

A control area (value range of control signal) is divided into bins $u_0(1) \ldots u_0(n_{bin})$, in which the values of the characteristic curve are stored as the calculation proceeds. Points $u_0(1) \ldots u_0(n_{bin})$ denote bin locations on the u-axis representing the control input and bin denotes the number of bins. Parameters $y_0(1) \ldots y_0(n_{bin})$ represent the values of output (measurement) y on the y-axis that represents the output. Thus the pairs $u_0(1)/y_0(1), \ldots u_0(n_{bin})/y_0(n_{bin})$ formed by the bin locations and values define a characteristic curve. In addition, the number of sample pairs used in the calculation of each bin value is calculated in counters nct(1) ... nct($n_{bin}$). The number of bins may be any desired one, for example 3, 5 or 10. The bin $u_0(1) \ldots u_0(n_{bin})$ values $y_0(1) \ldots y_0(n_{bin})$ are updated by means of the selected sample pairs using a predetermined weighting function.

In an embodiment of the invention, two pairs $b_n$, $b_{n-1}$ are updated according to each sample pair and these pairs are selected so that the following condition is fulfilled:

$$b_n < \frac{u_m - u_{\min}}{u_{\max} - u_{\min}}(n_{bin} - 1) + 1 < b_{n+1}$$

where
$u_m$ is the minute mean value of the control sample pair j,
$y_m$ is the minute mean value of the measurement of sample pair j,
n=1 ... bin,
$u_{min}$ and $u_{max}$ are the minimum and the maximum of the control area, respectively.

After this, the values $y_0(b_n)$ and $y_0(b_{n+1})$ of the selected bins $b_n$, and $b_{n-1}$ are updated as follows $$y_0(b_n) = \frac{nct(b_b)y_0(b_n) + w_1 y_m}{nct(b_n) + w_1}$$

$$y_0(b_{n+1}) = \frac{nct(b_{n+1})y_0(b_{n+1}) + w_2 y_m}{nct(b_{n+1}) + w_2}$$

where
nct(1) ... nct($n_{bin}$) each represents the number of updates (control/measurement pairs used) of each bin,
$w_n$ and $w_{n+1}$ are weighting coefficients $$w_n = 1 - \frac{|u_m - u_{\min} - (b_n - 1)u_{st}|}{u_{st}}$$

$$w_{n+1} = 1 - \frac{|u_m - u_{\min} - (b_{n+1} - 1)u_{st}|}{u_{st}}$$

$u_{st}$ is the distance between bins $$u_{st} = \frac{u_{\max} - u_{\min}}{n_{bin} - 1}$$

Finally, the numbers nct(bn) and nct(bn−1) of updates of the selected bins bn and bn−1 are updated as follows $$nct(b_n) = a * nct(b_n) + w_1$$

$$nct(b_{n+1}) = a * nct(b_{n+1}) + w_2$$

where a is a constant.

Constant a is a 'forgetting factor'. Usually a=1 is selected as the value of forgetting factor a, which means that forgetting is not in use. However, in continuous monitoring it may be advantageous to select a value a<1, typically a=0.9–0.9999. This value means that a newer measurement obtains a higher weighting coefficient in bin updating than an older measurement. Thus the influence of older measurements disappears gradually, i.e. they are "forgot".

It should be noted that the method of calculating curves described here is only one feasible calculation method; yet it improves the accuracy of calculation. Based on the above description, it is obvious to a person skilled in the art that other methods can also be used for calculating characteristic curves on the basis of the minute mean values selected and grouped according to the invention.

Hysteresis Calculation

The calculation 54 of characteristic curve produces two characteristic curves (or points of characteristic curves). One of the curves represents ascending control and the other one descending control. Hysteresis is calculated as a distance between the characteristic curves at one or more points in the direction of the control axis (u-axis). The selection of the number and location of the points preferably depends on how control has moved during a collection period.

Figure 8:
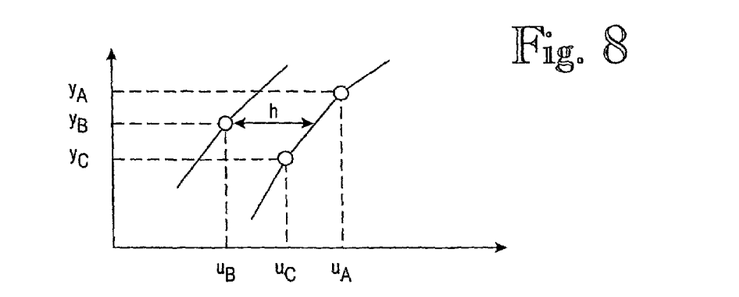
FIGS. 8 and 9 illustrate calculation of hysteresis from the characteristic curves.

Hysteresis calculation will be exemplified at one point with reference to FIG. 8. In the example, two points are known in one characteristic curve ($u_A$, $y_A$) and ($u_C$, $y_C$) and one point in the other characteristic curve ($u_B$, $y_B$) so that $y_A > y_B > y_C$. The distance between the characteristic curves in direction h of the u-axis is $$h = u_A - u_B + \frac{(u_C - u_A)(y_B - y_A)}{(y_C - y_A)}$$

Figure 9:
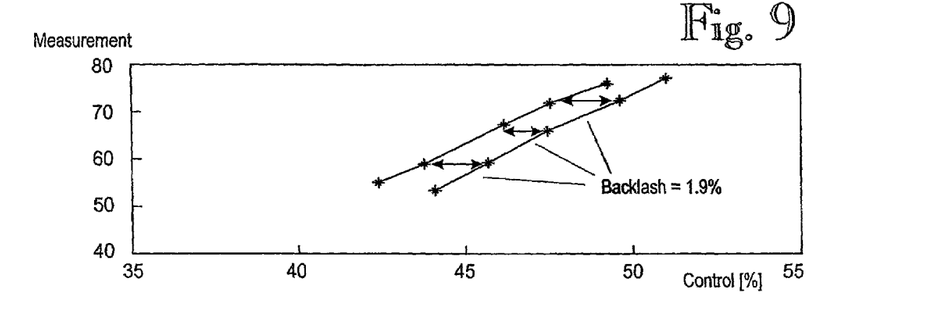

FIG. 9 illustrates two characteristic curves where hysteresis has been calculated at several points. The values of the control axis (u-axis) of the characteristic curves shown in FIG. 9 describe the control's relative share (%) of the whole control area (100%).

EXAMPLE

The calculation of the characteristic curve in the embodiment described above will be described here by an example. For the sake of clarity, the example describes only the calculation of one characteristic curve. In practice, the hysteresis calculation updates two characteristic curves according to the same principle.

Parameters used in the example
Number of bins: $n_{bin}=4$
Control min: $u_{min}=0$
Control max: $u_{max}=30$
Thus the distance between the bins is $u_{st}=10$.

Before updating, the vectors describing the characteristic curve do not actually include any information. The vectors are Measurements y0 of characteristic curve
Controls u0 of characteristic curve
Frequency information (number of hits) nct on characteristic curve y0=[0 0 0 0]

u0=[0 10 20 30]

nct=[0 0 0 0]

The following pair of control and measurement is added to the characteristic curve $u_m$=12

$y_m$=3

First, bins are selected according to the following formula $$b_1 < \frac{u_m - u_{min}}{u_{max} - u_{min}}(n_{bin} - 1) + 1 < b_2$$

$$\frac{u_m - u_{min}}{u_{max} - u_{min}}(n_{bin} - 1) + 1 = \frac{12-0}{30-0}(4-1) + 1$$

$$= 2.2 \Rightarrow b_1 = 2, b_2 = 3$$

Weighting coefficients are calculated $$w_1 = 1 - \frac{|u_m - u_{min} - (b_1 - 1)u_{st}|}{u_{st}}$$

$$= 1 - \frac{|12 - 0 - (2-1) \times 10|}{10}$$

$$= 0.8$$

Measurement vectors y0 are updated according to the following formula $$y_0(b_1) = \frac{nct(b_1)y_0(b_1) + w_1 y_m}{nct(b_1) + w_1}$$

$$= \frac{0 + 0.8 \times 3}{0 + 0.8}$$

$$= 3$$

Measurement vectors y0, bin 3 and bins 2 and 3 of the control vector u0 are updated in the same manner.
Vector nct is updated nct(2)=a*nct(2)+$w_1$=1*0+0.8=0.8 and the same is performed on bin 3. Forgetting factor a=1, which means that forgetting is not in use.

After the first pair of control and measurement, the vectors of the characteristic curve are:

y0=[0 3 3 0]

u0=[0 12 12 30]

nct=[0 0.8 0.2 0]

Next, the characteristic curve is updated using the following pair of control and measurement $u_m$=24

$y_m$=5

Now the control is between bins 3 and 4 ($b_1$=3, $b_2$=4) so that it is closer to bin 3 (weighting coefficient $w_1$=0.6) than to bin 4 (weighting coefficient $w_2$=0.4).
The measurement vector is updated as follows $$y_0(b_1) = \frac{nct(b_1)y_0(b_1) + w_1 y_m}{nct(b_1) + w_1}$$

$$= y_0(3)$$

$$= \frac{0.2 \times 3 + 0.6 \times 5}{0.2 + 0.6}$$

$$= 4.5$$

The same formula is used in updating the control $$u_0(3) = \frac{0.2 \times 12 + 0.6 \times 24}{0.2 + 0.6} = 21$$

vector nct is updated, nct(3)=nct(3)+w1=0.2+0.6=0.8 y0(4), u0(4), and nct(4) are updated as described above (the bin is empty before updating). Weighting coefficient w2=0.4.

After the second point, the vectors for the characteristic curve are y0=[0 3 4.5 5]

u0=[0 12 21 24]

nct=[0 0.8 0.8 0.4]

The following pair is still added $u_m$=15

$y_m$=4

The result is y0=[0 3.3846 4.3077 5.0000]

u0=[0 13.1538 18.6923 24.0000]

nct=[0 1.3000 1.3000 0.4000]

Assume further that the calculation has been continued by adding 97 pairs of measurement and control such that the control is a randomly selected integer between 0 to 30 and the measurement is the square root of this rounded to the nearest integer.

Figure 10:
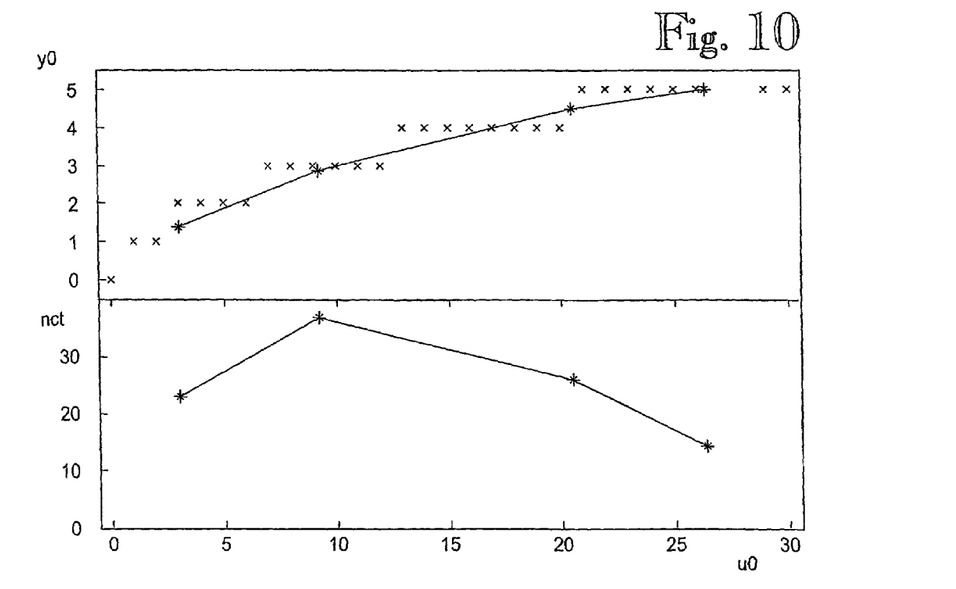
FIG. 10 is a graphical presentation where the upper image illustrates control measurement pairs and a calculated characteristic curve, and the lower image illustrates a frequency curve.

The upper image in FIG. 10 illustrates the pairs (x) of control and measurement used in the example and the calculated characteristic curve (-*-) y0 vs. u0. The lower image illustrates the frequency curve nct vs. u0 (-*-).

In all the embodiments described above and in other variations of the invention, the measurement y can be replaced with the set point r or a signal representing it.

The description and the related figures are only intended to illutrate the principles of the present invention. Various embodiments, variations and modifications are obvious to a person skilled in the art on the basis of this description. The present invention is not limited by the examples but it may be modified within the scope and spirit of the attached claims.

The invention claimed is:

1. A method of determining hysteresis of a process device in a process, the method comprising
measuring a control input to the process device during normal operation of the process device in an industrial process,
measuring a process output of the process device during normal operation of the process device in the industrial process,
collecting sample pairs of signals representing said control input and said measured process output of the process device during normal operation of the process device in the industrial process,
storing the collected sample pairs in a database,
calculating the hysteresis of the process device on the basis of the collected sample pairs,
each collected sample pair including an average control input and an average output for a predetermined collection period,
screening the sample pairs suitable for further processing at least according to the magnitude and direction of the relative change of the average control input of each sample pair,
grouping the sample pairs into a first and a second group at least according to the direction of the relative change of the average control input of each sample pair,
calculating a first and a second control/output characteristic curve by means of the screened sample pairs of the first and the second group, respectively,
determining and storing the hysteresis of the process device as a distance between the first and the second characteristic curve at least at one point.

2. A method according to claim 1, wherein the screening comprises
selecting a sample pair $u_m(j)$, $y_m(j)$ for the calculation of the characteristic curve if the following two conditions are fulfilled:

$|\Delta u_m(j)| < |\Delta u_m(j-1)|$ $\text{sign}(\Delta u_m(j)) = \text{sign}(\Delta u_m(j-1))$ where
$u_m(j)$ is the average control input of sample pair j,
$y_m(i)$ is the average measured output of sample pair j,
j is an integer index, $\Delta u_m(j) = u_m(j) - u_m(j-1)$ $\text{sign}(\Delta u_m)$ calculates the sign Of $\Delta u_m$.

3. A method according to claim 2, wherein the sample pairs are grouped into a first and a second group on the basis of the following rule:
if the sign of $\Delta u_m$ is positive, the sample pair belongs to the first group,
if the sign of $\Delta u_m$ is negative, the sample pair belongs to the second group.

4. A method according to claim 1, comprising calculating a reliability value for hysteresis by a function, which includes the following information as parameters
the number Ny1 of average sample pairs belonging to the first, ascending characteristic curve,
the number Ny2 of average sample pairs belonging to the second, descending characteristic curve,
the number Noy1 of sample pairs which belong to the first characteristic curve but are below the second characteristic curve, and
the number Noy2 of sample pairs which belong to the second characteristic curve but are above the first control curve.

5. A method according to claim 4, wherein
the reliability value L is calculated by function L=max (0.1−Noy1/Ny1−Noy2/Ny2), in which case L may obtain values from 0 to 1, where L=1 is completely reliable and L=0 is completely unreliable.

6. A method according to claim 1, wherein the calculation of each characteristic curve comprises
dividing the control area of the control input into bins $u_0(1) \ldots u_0(n_{bin})$, where $u_0(1) \ldots u_0(n_{bin})$ is the location of the bins on the u-axis representing the control input and bin is the number of bins, in which case the values $y_0(1) \ldots y_0(n_{bin})$ included in the bins represent output values on the y-axis describing the output, and value pairs $u_0(1)/y_0(1), \ldots, u_0(n_{bin})/y_0(n_{bin})$ define a characteristic curve, updating the values $y_0(1) \ldots y_0(n_{bin})$ of the bins $u_0(1) \ldots u_0(n_{bin})$ by means of the average sample pairs using a predetermined weighting function.

7. A method according to claim 6, comprising updating two bins $b_n$, $b_{n-1}$ according to each sample pair, the bins being selected so that the following condition is fulfilled $$b_n < \frac{u_m - u_{\min}}{u_{\max} - u_{\min}}(n_{bin} - 1) + 1 < b_{n+1}$$

where $u_m$ is the minute mean value of the control of sample pair j, $y_m$ is the minute mean value of the measurement of sample pair j, n=1 ... bin, $u_{min}$ and $u_{max}$ are the minimum and the maximum of the control area, respectively, updating the values $y_0(b_n)$ and $y_0(b_{n+1})$ of the selected bins $b_n$, and $b_{n+1}$ as follows $$y_0(b_n) = \frac{nct(b_b)y_0(b_n) + w_1 y_m}{nct(b_n) + w_1}$$

$$y_0(b_{n+1}) = \frac{nct(b_{n+1})y_0(b_{n+1}) + w_2 y_m}{nct(b_{n+1}) + w_2}$$

where $nct(1) \ldots nct(b_{n+1})$ each represents the number of updates (control/measurement pairs used) of each bin, $w_n$ and $w_{n+1}$ are weighting coefficients $$w_n = 1 - \frac{|u_m - u_{\min} - (b_n - 1)u_{st}|}{u_{st}}$$

$$w_{n+1} = 1 - \frac{|u_m - u_{\min} - (b_{n+1} - 1)u_{st}|}{u_{st}}$$

$u_{st}$ is the distance between the bins $$u_{st} = \frac{u_{\max} - u_{\min}}{n_{bin} - 1}$$

updating the numbers nct(bn) and nct(bn−1) of updates of the selected bins bn and bn−1 as follows $nct(b_n) = a * nct(b_n) + w_1$ $nct(b_{n+1}) = a * nct(b_{n+1}) + w_2$ where a is constant.

8. A method according to claim 1, wherein the signal representing the process output comprises one of the following: a measured process variable, or a set point of a process variable in process control.

9. A method according to claim 1, wherein the screening comprises calculating the change of average control input for each sample pair in relation to the average control input of the previous sample pair and the direction of the change, if the calculated change is smaller than the change calculated for the control input of the previous sample pair and has occurred in the same direction as the change calculated for the control input of the previous sample pair, the sample pair is selected for further processing; otherwise the sample pair is rejected.

10. A method according to claim 1, wherein the direction of the change is determined by calculating the sign of the change, in which case the sign is positive if the control input is increasing, and negative if the control input is decreasing.

11. A method according to claim 1, wherein the collecting comprises taking a momentary sample pair from the control input and measured output at certain intervals, the interval being preferably at least one second or longer, calculating the average sample pair from the momentary sample pairs taken during the collection period, which is preferably at least one minute or longer.

12. A system for determining hysteresis of a process device in a process environment, the system comprising means for measuring a control input to the process device during normal operation of the process device in an industrial process, means for measuring a process output of the process device during normal operation of the process device in the industrial process, means for collecting sample pairs of signals representing said control input and said measured process output of the process device during normal operation of the process device in the industrial process, a database storing the collected sample pairs, each collected sample pair including an average control input and an average control output for a predetermined collection period, and the system comprises means for screening sample pairs that are suitable for further processing at least according to the magnitude and direction of the relative change of the average control input of each sample pair, means for grouping the sample pairs into a first and a second group at least according to the direction of the relative change of the average control input of each sample pair, means for calculating a first and a second control/output characteristic curve by means of the first and the second screened sample pair, respectively, means for determining and storing the hysteresis of the process device as a distance between the first and the second characteristic curve at least at one point.

13. A system according to claim 12, wherein the screening means comprise means for calculating the change of the average control input for each sample pair in relation to the average control input of the previous sample pair and the direction of the change, and for selecting a sample pair for further processing if the calculated change is smaller than the change calculated for the control input of the previous sample pair and has occurred in the same direction; otherwise the sample pair is rejected.

14. A system according to claim 13, wherein the reliability value L is calculated by function L=max (0.1−Noy1/Ny1−Noy2/Ny2), in which case L may obtain values from 0 to 1, where L=1 is completely reliable and L=0 completely unreliable.

15. A system according to claim 12, wherein the signal representing the process output comprises at least one of the following: a measured process variable, or a set point of a process variable in process control.

16. A system according to claim 12, comprises means for calculating a reliability value for hysteresis by a function which includes the following information as parameters
- the number Ny1 of average sample pairs belonging to the first, ascending characteristic curve,
- the number Ny2 of average sample pairs belonging to the second, descending characteristic curve,
- the number Noy1 of sample pairs which belong to the first characteristic curve but are below the second characteristic curve, and
- the number Noy2 of sample pairs which belong to the second characteristic curve but are above the first control curve.

17. A computer-readable storage medium comprising executable code presenting a computer program that cause a computer to implement at least the following steps determining hysteresis of a process device in a process:
- measurng a control input to the process device during normal operation of the process device in an industrial process,
- measuring a process output of the process device during normal operation of the process device in the industrial process,
- collecting sample pairs of signals representing said control input and said measured process output of the process device during normal operation of the process device in the industrial process, each collected sample pair including an average control input and an average output for a predetermined collection period,
- storing the collected sample pairs in a database,
- calculating the hysteresis of the process device on the basis of the collected sample pairs,
- screening the sample pairs suitable for further processing at least according to the magnitude and direction of the relative change of the average control input of each sample pair,
- grouping the sample pairs into a first and a second group at least according to the direction of the relative change of the average control input of each sample pair,
- calculating a first and a second control/output characteristic curve by means of the screened sample pairs of the first and the second group, respectively, and
- determining and storing the hysteresis of the process device as a distance between the first and the second characteristic curve at least at one point.

* * * * *